United States Patent
Ng et al.

(10) Patent No.: US 12,182,611 B2
(45) Date of Patent: Dec. 31, 2024

(54) INTERRUPT CACHE CONFIGURATION

(71) Applicants: Advanced Micro Devices, Inc, Santa Clara, CA (US); ATI Technologies ULC, Markham (CA)

(72) Inventors: Philip Ng, Toronto (CA); Anil Kumar, Austin, TX (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 75 days.

(21) Appl. No.: 18/145,457

(22) Filed: Dec. 22, 2022

(65) Prior Publication Data
US 2024/0211300 A1 Jun. 27, 2024

(51) Int. Cl.
*G06F 9/48* (2006.01)
*G06F 9/30* (2018.01)
*G06F 11/07* (2006.01)

(52) U.S. Cl.
CPC ........ *G06F 9/4812* (2013.01); *G06F 9/30047* (2013.01); *G06F 11/0757* (2013.01)

(58) Field of Classification Search
CPC . G06F 9/4812; G06F 9/30047; G06F 11/0757
See application file for complete search history.

(56) References Cited

U.S. PATENT DOCUMENTS

| | | | |
|---|---|---|---|
| 10,545,893 B1* | 1/2020 | Xu | G06F 11/2043 |
| 11,237,994 B2* | 2/2022 | Zhao | G06F 15/7807 |
| 11,263,043 B1* | 3/2022 | Mukherjee | G06F 9/3836 |
| 11,392,406 B1* | 7/2022 | Volpe | G06F 11/0721 |
| 11,630,790 B1* | 4/2023 | Zhang | G06F 13/28 |
| | | | 710/260 |
| 2013/0046915 A1* | 2/2013 | Kothari | H03L 7/097 |
| | | | 710/317 |
| 2015/0127866 A1* | 5/2015 | Zeng | G06F 9/45558 |
| | | | 710/264 |
| 2017/0161217 A1* | 6/2017 | Im | G06F 9/30123 |
| 2022/0413712 A1* | 12/2022 | Mukhopadhyay | G06F 3/0619 |

* cited by examiner

*Primary Examiner* — Henry Tsai
*Assistant Examiner* — Christopher A Daley
(74) *Attorney, Agent, or Firm* — FIG. 1 Patents

(57) ABSTRACT

An apparatus includes an interrupt cache having cache storage configured to store a plurality of interrupts received from an interrupt source, the plurality of interrupts corresponding to a plurality of interrupt events configured for execution by the plurality of interrupt service routines and a cache manager component configured to generate an interrupt message for transmission to the processing unit, the interrupt message generated to include at least one interrupt of the plurality of interrupts from the cache storage.

20 Claims, 5 Drawing Sheets

```
                    ┌─────────────────────────────────────────────────────────┐
                    │                          502                            │
                    │ Receive an interrupt by an interrupt cache from an       │
                    │ interrupt source, the interrupt corresponding to an      │
                    │ interrupt event configured for execution by an           │
                    │ interrupt service routine executed by a processing unit  │
                    └─────────────────────────────────────────────────────────┘
                                              │
                                              ▼
                    ┌─────────────────────────────────────────────────────────┐
                    │                          504                            │
                    │ Generate an interrupt message by the interrupt cache for │
                    │ transmission to the processing unit, the interrupt      │
                    │ message including at least one interrupt from the        │
                    │ interrupt cache that is to be replaced in the interrupt  │
                    │ cache by the received interrupt                          │
                    └─────────────────────────────────────────────────────────┘
                                              │
                                              ▼
                    ┌─────────────────────────────────────────────────────────┐
                    │                          506                            │
                    │         Store the received interrupt in the interrupt cache │
                    └─────────────────────────────────────────────────────────┘
```

FIG. 5

INTERRUPT CACHE CONFIGURATION

BACKGROUND

Interrupts involve requests originated by a variety of different interrupt sources, e.g., devices such as processing units. These requests are configured to cause execution of an interrupt event using a processing unit by a respective interrupt service routine, also referred to as an interrupt handler. In other words, the interrupt is used to signal the processing unit to execute the interrupt service routine to process the interrupt event. To do so, the processing unit ceases processing that is currently being performed and initiates execution of the interrupt service routine to process the interrupt event. By employing these techniques, the devices and software are configured to address time-sensitive processing. However, conventional techniques used to implement interrupt-based techniques are incapable of scaling to expand these techniques from supporting hundreds and thousands of interrupts in order to support potentially millions of interrupts.

BRIEF DESCRIPTION OF THE DRAWINGS

The detailed description is described with reference to the accompanying figures.

FIG. 5 depicts a procedure in an example implementation of interrupt cache configuration and usage.

DETAILED DESCRIPTION

Overview

Figure 1:
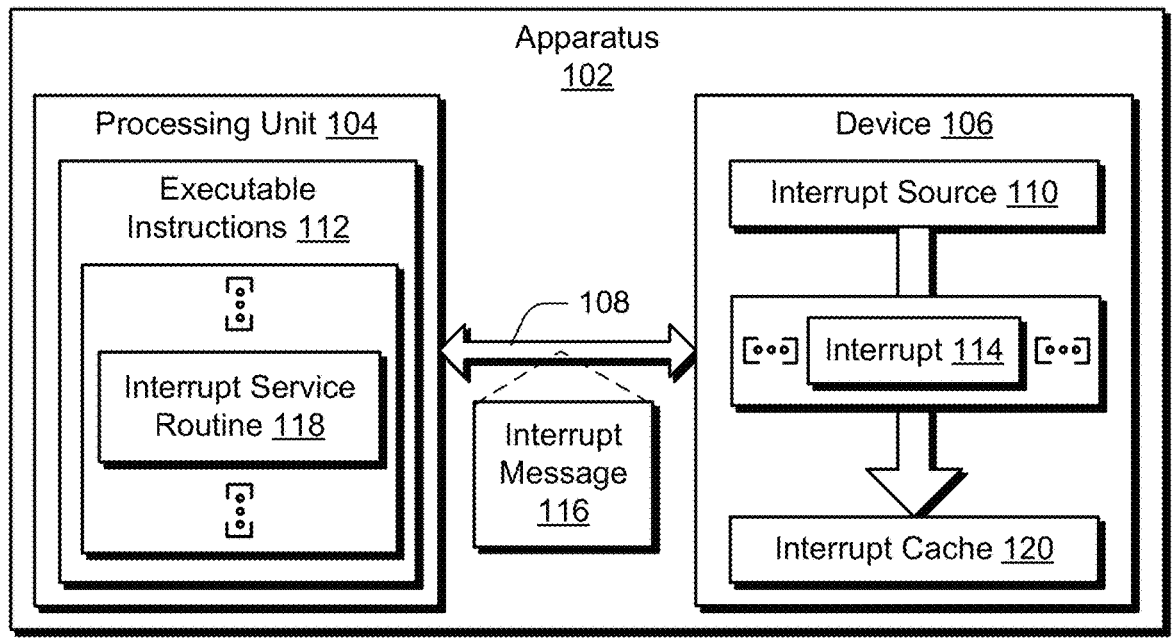
FIG. 1 is a block diagram of a non-limiting example system configured to employ interrupt cache configuration and management techniques.

Interrupts are one of the primary techniques used to implement time-sensitive processing. An interrupt is used to signal a processing unit to execute an interrupt service routine to process an interrupt event. As part of this, the processing unit ceases current processing, saves a current state, and then processes the interrupt event. Conventional techniques to improve processing unit performance involve coalescing multiple instances of the same interrupt event into a single interrupt message at the interrupt source. This allows a single execution of the processing unit interrupt service routine to service the multiple interrupt events, improving efficiency such as through processing unit cache locality and reducing the number of context switches. Interrupt coalescing commonly involves dedicated hardware per supported interrupt and interrupt message. Although conventional techniques for interrupt coalescing are capable of addressing hundreds and even thousands of interrupts, it is not feasible for these conventional techniques to scale in dedicated silicon resources to support millions of interrupts.

To solve these problems, interrupt cache configuration techniques are described to coalesce interrupts, also referred to as interrupt vectors. As part of this, an interrupt cache is utilized to hold an active set of interrupts (i.e., a "hot set") being coalesced. The interrupt cache is configurable as a set associate cache that utilizes a replacement algorithm implemented using a cache management component to manage cache entries in cache storage that are used to maintain the interrupts. The cache entries, for instance, implement a "tag" that is usable to determine a hit or miss to the interrupt cache, i.e., whether a cache entry includes an interrupt that corresponds to a vector of a received interrupt. Cache data is also storable as part of the interrupt cache, e.g., to indicate a number of coalesced instances of a respective interrupt in the cache storage, information related to a delay time that is used to control a maximum of delay until the interrupt is sent as part of an interrupt message, and so forth.

The interrupt cache is configured to manage communication of interrupt messages to a processing unit, e.g., for execution of interrupt events by respective interrupt service routines of the processing unit. When an interrupt event occurs, the interrupt cache is checked to see if there are prior instances of a received interrupt pending, i.e., currently stored in cache storage. In an instance of a "hit" in that the received interrupt is already included in the cache storage, the cache data indicating a number of instances of the interrupt is incremented and the delay time remains the same. When a threshold number of instances are reached and/or the delay time is exceeded, an interrupt message is generated by the interrupt cache for communication to the processing unit.

In an instance of a "miss" in which the received interrupt is not already included in the cache storage, the interrupt is stored in the cache storage and the cache data is generated indicating the number of instances and the delay time. In a scenario in which the cache storage is "full," an interrupt message is generated to communicate an interrupt included in the cache storage as an interrupt message, i.e., to "make room" for the received interrupt. The received interrupt then replaces the interrupt in the cache storage. The interrupt that is replaced in the cache is selectable in a variety of ways, such as based on least-recently-used technique, based on an amount of time remaining toward the delay time, a number of instances of the interrupt, and so forth. In this way, the techniques described herein are scalable to address potentially millions of interrupts that are not possible using conventional techniques involving dedicated hardware for each interrupt type. A variety of other instances are also contemplated, examples of which are described in the following discussion and shown using corresponding figures.

In some aspects, the techniques described herein relate to an apparatus including, a processing unit configured to execute a plurality of interrupt service routines, and an interrupt cache including, cache storage configured to store a plurality of interrupts received from an interrupt source, the plurality of interrupts corresponding to a plurality of interrupt events configured for execution by the plurality of interrupt service routines, and a cache manager component configured to generate an interrupt message for transmission to the processing unit, the interrupt message generated to include at least one interrupt of the plurality of interrupts from the cache storage.

In some aspects, the techniques described herein relate to an apparatus, wherein the cache manager component is configured to maintain data including a number of instances of respective interrupts of the plurality of interrupts stored in the cache storage and the interrupt message is generated based on the data.

In some aspects, the techniques described herein relate to an apparatus, wherein the cache manager component is configured to maintain data indicating an amount of time to delay transmission of respective interrupts of the plurality of interrupts stored in the cache storage and the interrupt message is generated based on the data.

In some aspects, the techniques described herein relate to an apparatus, wherein the cache manager component is configured to generate the interrupt message based on detecting an amount of time associated with the at least one interrupt has been exceeded.

In some aspects, the techniques described herein relate to an apparatus, wherein the cache manager component is configured to perform the detecting at respective time intervals.

In some aspects, the techniques described herein relate to an apparatus, wherein the plurality of interrupts is associated with a plurality of amounts of time and the interrupt message is generated for the at least one interrupt message based on detecting the at least one interrupt has a least amount of time remaining of the plurality of amounts of time.

In some aspects, the techniques described herein relate to an apparatus, wherein the cache manager component is configured to generate the interrupt message based on detecting whether a received interrupt is a hit or a miss to the plurality of interrupts stored in the cache storage.

In some aspects, the techniques described herein relate to an apparatus, wherein the cache manager component is configured to adjust a counter based on detecting the received interrupt is a hit, the counter indicating a number of instances of the received interrupt that are included in the cache storage.

In some aspects, the techniques described herein relate to an apparatus, wherein the cache manager component is configured to generate the interrupt message including the at least one interrupt from the interrupt cache based on detecting the received interrupt is a miss and the cache storage is full.

In some aspects, the techniques described herein relate to an apparatus, wherein the received interrupt replaces the at least one interrupt in the cache storage.

In some aspects, the techniques described herein relate to an apparatus, wherein the at least one interrupt is included in the interrupt message for transmission to a respective interrupt service routine of the plurality of interrupt service routines, the respective interrupt service routine identified based on a vector included as part of the at least one interrupt.

In some aspects, the techniques described herein relate to an apparatus, wherein the cache manager component is configured to bypass the cache storage based on one or more heuristics.

In some aspects, the techniques described herein relate to an apparatus, wherein the interrupt source and interrupt cache are included as part of the processing unit.

In some aspects, the techniques described herein relate to an interrupt cache including, cache storage configured to store a plurality of cache entries for a plurality of interrupts, the plurality of interrupts identifying a plurality of interrupt events configured for execution, respectively, by a plurality of interrupt service routines by a processing unit, and a cache manager component configured to generate an interrupt message including at least one interrupt event of the plurality of interrupt events from the cache storage for transmission to the processing unit based on detecting whether a received interrupt event is a hit or a miss to the plurality of interrupt events.

In some aspects, the techniques described herein relate to an interrupt cache, wherein the cache manager component is configured to maintain data including a number of instances of respective interrupts of the plurality of interrupts stored in the cache storage and generate the interrupt message generated based on the data.

In some aspects, the techniques described herein relate to an interrupt cache, wherein the cache manager component is configured to maintain data indicating an amount of time to delay transmission of respective interrupts of the plurality of interrupts stored in the cache storage and generate the interrupt message based on the data.

In some aspects, the techniques described herein relate to an interrupt cache, wherein the cache manager component is configured to adjust a counter indicating a number of instances of a received interrupt that are included in the cache storage based on detecting the received interrupt is a hit to the cache storage.

In some aspects, the techniques described herein relate to an interrupt cache, wherein the cache manager component is configured to generate the interrupt message including the at least one interrupt from the interrupt cache based on detecting a received interrupt is a miss to the cache storage and the cache storage is full.

In some aspects, the techniques described herein relate to a method including, receiving an interrupt by an interrupt cache from an interrupt source, the interrupt corresponding to an interrupt event configured for execution by an interrupt service routine executed by a processing unit, generating an interrupt message by the interrupt cache for transmission to the processing unit, the interrupt message including at least one interrupt from the interrupt cache that is to be replaced in the interrupt cache by the received interrupt, and storing the received interrupt in the interrupt cache.

In some aspects, the techniques described herein relate to a method, further including maintaining data including a number of instances of respective interrupts of a plurality of interrupts stored in cache storage of the interrupt cache and the generating of the interrupt message is based on the data.

FIG. 1 is a block diagram of a non-limiting example system 100 configured to employ interrupt cache configuration and management techniques. The system 100 includes an apparatus 102 having a processing unit 104 and a device 106 that are communicatively coupled, one to another, using a communication link 108, e.g., a bus. Although illustrated separately, the device 106 is also configurable as a processing unit that includes the interrupt source 110 and the interrupt cache. The processing unit in this example is configurable as a processing unit that services the interrupt, or a different processing unit.

These techniques are usable by a wide range of configurations of both the apparatus 102 and the device 106. Examples of which include, by way of example and not limitation, computing devices, servers, mobile devices (e.g., wearables, mobile phones, tablets, laptops), processors (e.g., graphics processing units, central processing units, and accelerators), digital signal processors, interference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders.

The system 100 is configured to employ an interrupt architecture, and thus is "interrupt driven." As part of this, an interrupt source 110 is configured to signal executable instructions 112 of a processing unit 104 to interrupt current execution of the executable instructions 112 to process an interrupt event. To do so, an interrupt 114 is generated by the interrupt source 110 and included as part of an interrupt message 116 for communication over the communication link 108 to the processing unit 104. A corresponding interrupt service routine 118 (also known as an interrupt handler) is then located and initiated that as having a type corresponding to the interrupt 114, execution of which is then used to process the corresponding interrupt event. The interrupt source 110 is configurable in a variety of ways, such as to generate a hardware interrupt, software interrupt, from processor-to-processor, and so forth. Interrupts 114, for instance, are usable by the device 106 as implemented in hardware to indicate state changes that are time sensitive and in this way support multitasking and real-time performance.

As previously described, conventional interrupt techniques involve use of dedicated hardware for each type of interrupt. Conventional techniques are therefore incapable of scaling in silicon beyond a few thousand interrupt types. In the techniques describe herein, however, an interrupt cache 120 is utilized to decouple coalescing hardware from a total number of interrupts. The interrupt cache 120 is used, for instance, to provide coalescing to an active (i.e., "hot") set of interrupts 114. Additional heuristics are employable by the interrupt cache 120, e.g., to support bypass of coalescing within the cache to conserve cache resources via hints from the interrupt source 110, a prediction mechanism, and so forth.

Use of the interrupt cache 120 supports a relatively fixed hardware cost in comparison to conventional techniques to implement interrupt coalescing, while supporting an arbitrary number of interrupt vectors. This provides support for a large number (e.g., over ten thousand to millions) of interrupts, whereas conventional solutions are limited through use of dedicated counters and timers in hardware per interrupt. Consider a system that initializes a hundred thousand virtual machines, with thousands of which involving active execution at any point in time, each associated with a hardware accelerator, i.e., the device 106. Support of even a handful of interrupts per accelerator involves scaling of significant amounts of hardware resources and is inefficient and wasteful due to fundamental limits on a number of interrupts a device is capable of generating within a given window of time. According, the interrupt cache configuration techniques address these challenges and improve device operation to support large numbers of interrupts.

Figure 2:
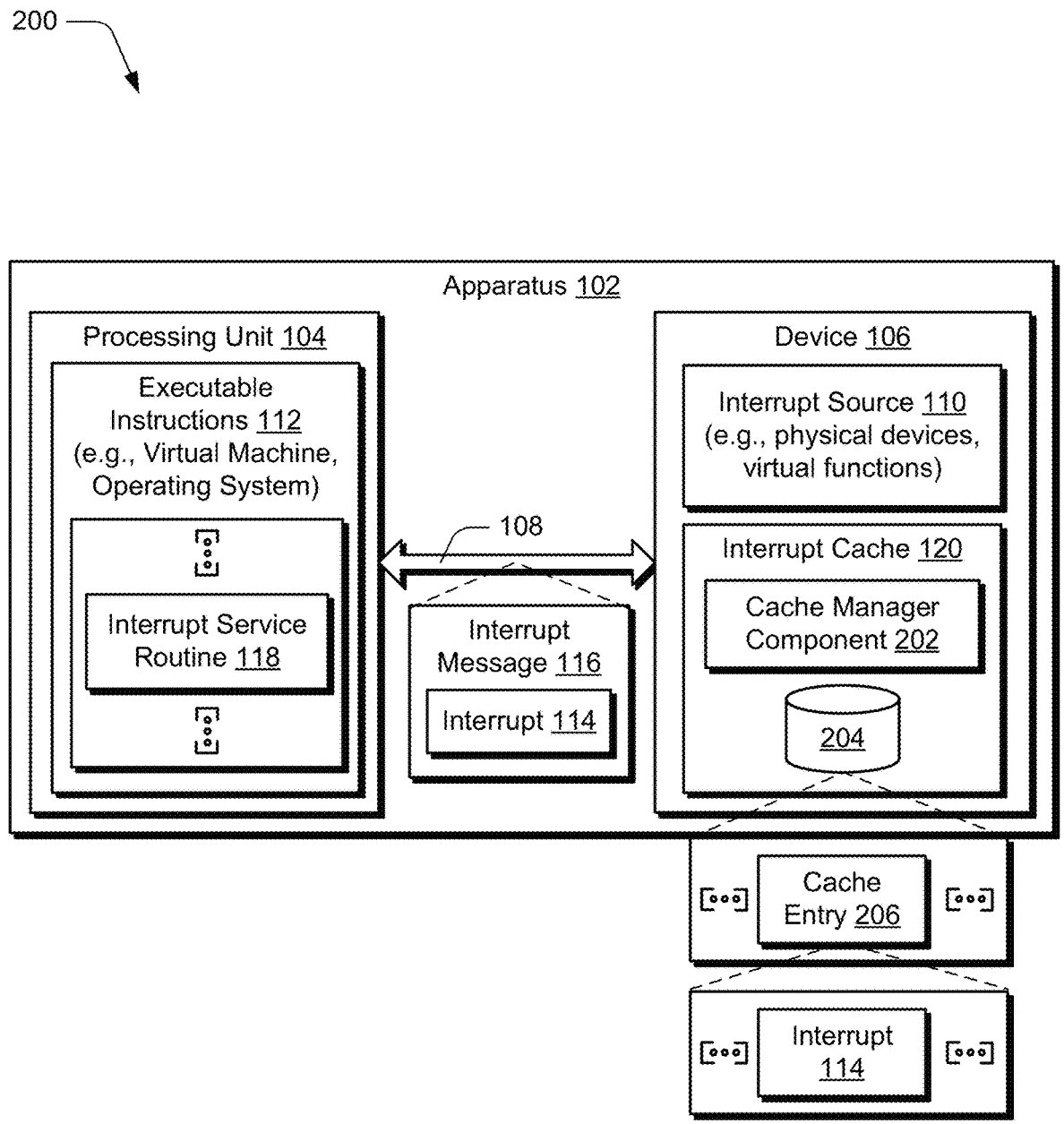
FIG. 2 is a block diagram of a non-limiting example system showing operation of an interrupt cache of FIG. 1 in greater detail.

FIG. 2 is a block diagram of a non-limiting example system 200 showing operation of the interrupt cache 120 of FIG. 1 in greater detail. The apparatus 102 in this example includes the processing unit 104, the device 106, communication link 108, interrupt source 110, executable instructions 112, interrupt message 116, and interrupt cache 120 as previously described. The interrupt source 110 is configurable in a variety of ways, examples of which include physical devices, virtual functions, and so forth. Likewise the executable instructions 112 are also configurable in a variety of ways, e.g., as virtual machines, operating systems, and so forth.

An interrupt event involves processing by the processing unit 104 through execution of a corresponding interrupt service routine 118. The device 106 supports a variety of different interrupt event types, such as network packet received, disk write completed, and so forth. An interrupt includes a vector (and therefore also referred to as an "interrupt vector") that is used to identify the corresponding interrupt service routine 118 to handle one or more interrupt event type types. Accordingly, each interrupt event corresponds to an interrupt vector, which includes "N" event types for a single vector.

The interrupt message 116 is a message (e.g., a direct memory access write), which is configurable to transfer data between the device 106 and the processing unit 104 directly, e.g., without processing using a central processing unit. The interrupt message 116 is configured to trigger execution of a corresponding interrupt service routine 118 on a thread of the processing unit 104. The interrupt service routine 118 is implemented as a software routine executed on a thread of the processing unit 104 to process an interrupt event corresponding to a respective interrupt.

Interrupt coalescing is a technique in which multiple instances of interrupts 114 included in respective interrupt messages 116 are coalesced. This supports processing of multiple interrupt events within a single execution of the corresponding interrupt service routine 118, which improves operational efficiency and performance. Therefore, in an example in which the device 106 is configured for network communication, operational efficiency is increased by delaying generation of the interrupt message 116 in order to collect a batch of packets. The corresponding interrupt service routine 118 that is tasked with processing the packets has improved efficiency from a perspective of processing by the processing unit 104 by processing the batch of packets together. However, use of dedicated hardware by conventional techniques limits an ability of these techniques to scale.

Accordingly, the interrupt cache 120 in this example includes a cache manager component 202 and cache storage 204. The cache storage 204 is configured to maintain cache entries 206 for respective interrupts 114 received from the interrupt source 110. The cache manager component 202 is configured to control when the interrupts 114 are included in the interrupt message 116 for communication to and processing by the corresponding interrupt service routine 118 of the processing unit 104. In this way, instead of using a dedicated counter and timer implemented per interrupt in hardware in conventional techniques, the cache storage 204 of the interrupt cache 120 stores an active set of interrupts 114 being coalesced.

Figure 3:
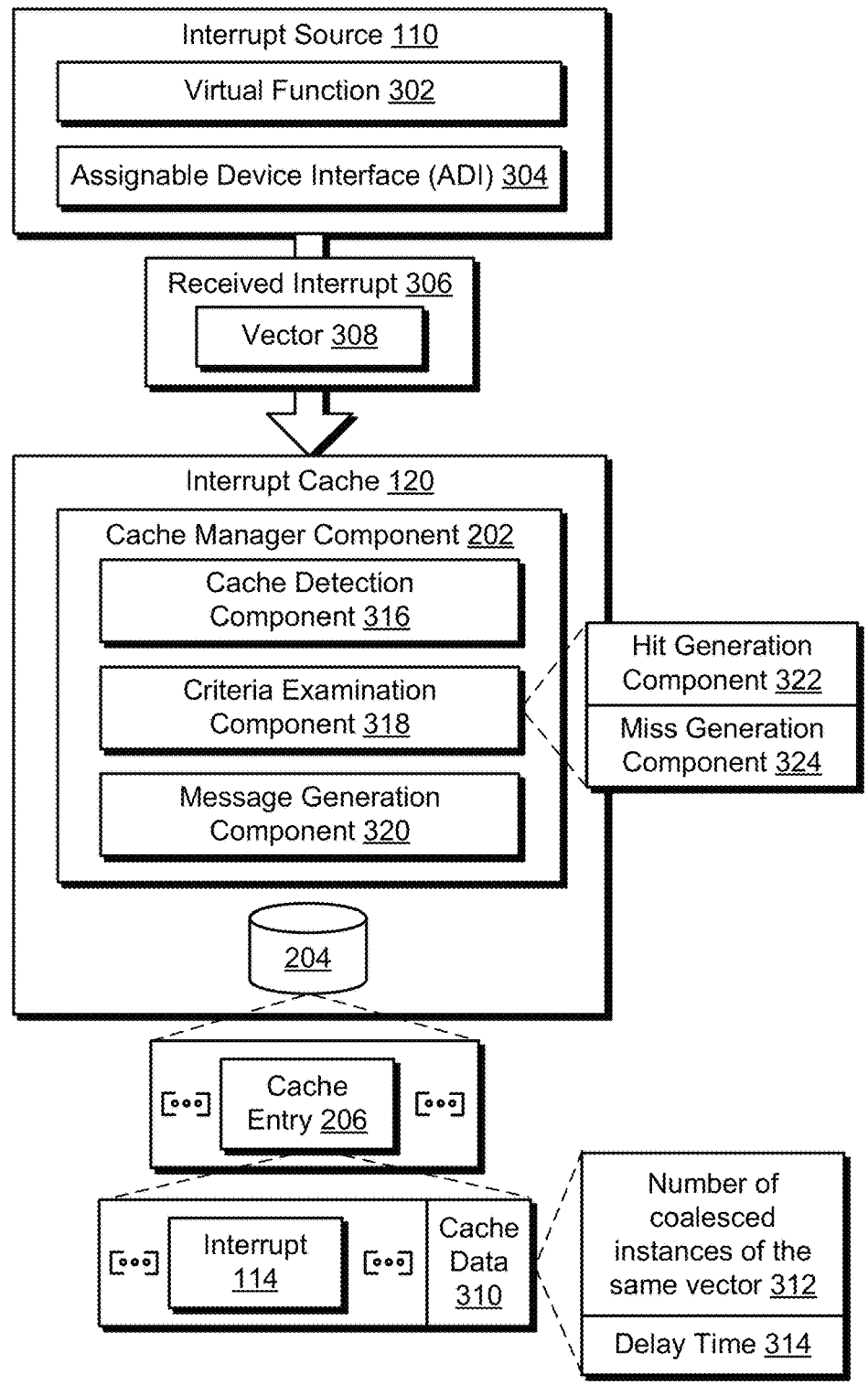
FIG. 3 is a block diagram of a non-limiting example system showing operation of the interrupt cache of FIG. 2 in greater detail as processing a received interrupt.

FIG. 3 is a block diagram of a non-limiting example system 300 showing operation of the interrupt cache 120 of FIG. 2 in greater detail as processing a received interrupt. An interrupt source 110, such as a virtual function 302, assignable device interface 304 (ADI), and so on generates an interrupt received by an interrupt cache 120, which is illustrated as a received interrupt 306 having a vector 308. The vector 308 as previously described is usable to identify which interrupt service routine 118 is to be used to process a corresponding interrupt event.

The cache manager component 202 is configured to manage which cache entries 206 and corresponding interrupts 114 are maintained in cache storage 204. As part of this, the cache manager component 202 generates cache data 310 that is maintained as part of the interrupt cache 120, e.g., by the cache storage 204. Examples of cache data 310 include a number of coalesced instances of the same vector 312 included in the cache storage 204, a delay time 314 that specifies an amount of time that is to be used to specify when to include a respective interrupt 114 as part of an interrupt message 116, and so forth.

At initial loading of a cache entry 206, for instance, a maximum number of instances is set, which is count down toward zero responsive to subsequent hits to the interrupt cache 120, i.e., the cache storage 204 includes the interrupt 114. The delay time 314 is configurable as a timestamp that is set upon initial loading of the cache entries 206 specifying when a respective interrupt 114 is to be included in an interrupt message 116.

Functionality of the cache manager component 202 to manage membership of interrupts 114 in the cache storage 204 is illustrated as a cache detection component 316, a criteria examination component 318, and a message generation component 320. When an interrupt event occurs, the received interrupt 306, and more particularly a vector 308 of the received interrupt 306, is used by the cache detection component 316 to detect whether that are prior instances of that vector 308 in cache storage 204, and thus are pending for inclusion in a respective interrupt message 116.

The criteria examination component 318 is then utilized to employ criteria based on whether the received interrupt 306 is a "hit" to the cache storage 204, i.e., a prior instance of the vector 308 is already included in the cache storage 204. On the other hand, a "miss" to cache storage 204 as detected by the cache detection component 316 as indicative that the vector 308 is not already included in the cache storage 204. This functionality is represented by a hit generation component 322 and a miss generation component 324.

Consider a scenario in which the received interrupt 306 is a hit to the cache storage 204 as detected by the cache detection component 316. The hit generation component 322 is configured to adjust a counter, e.g., a counter indicating a number of coalesced instances of the same vector 312. The delay time 314 is not adjusted. Continuing the above example, the counter is decremented from an initially set value for each instance in the cache storage 204. When the counter reaches zero, the interrupts 114 are included in an interrupt message 116 by the message generation component 320 for transmission to the processing unit 104 and the cache entry 206 is cleared, e.g., made invalid.

In another scenario, the received interrupt 306 is a miss to the cache entries 206, i.e., is not already included in the interrupt cache 120. Accordingly, the received interrupt 306 is stored by the miss generation component 324 in a respective cache entry 206 within the cache storage 204. In an instance in which the cache storage 204 is full, however, and there is not currently room for inclusion of the received interrupt 306 as one of the cache entries 206, the received interrupt 306 replaces an interrupt 114 already included as part the cache entries 206. The replaced interrupt 114 is therefore included as part of a interrupt message 116 to "make room" in cache storage 204 for the received interrupt 306, an example of which is further described in the following discussion.

Figure 4:
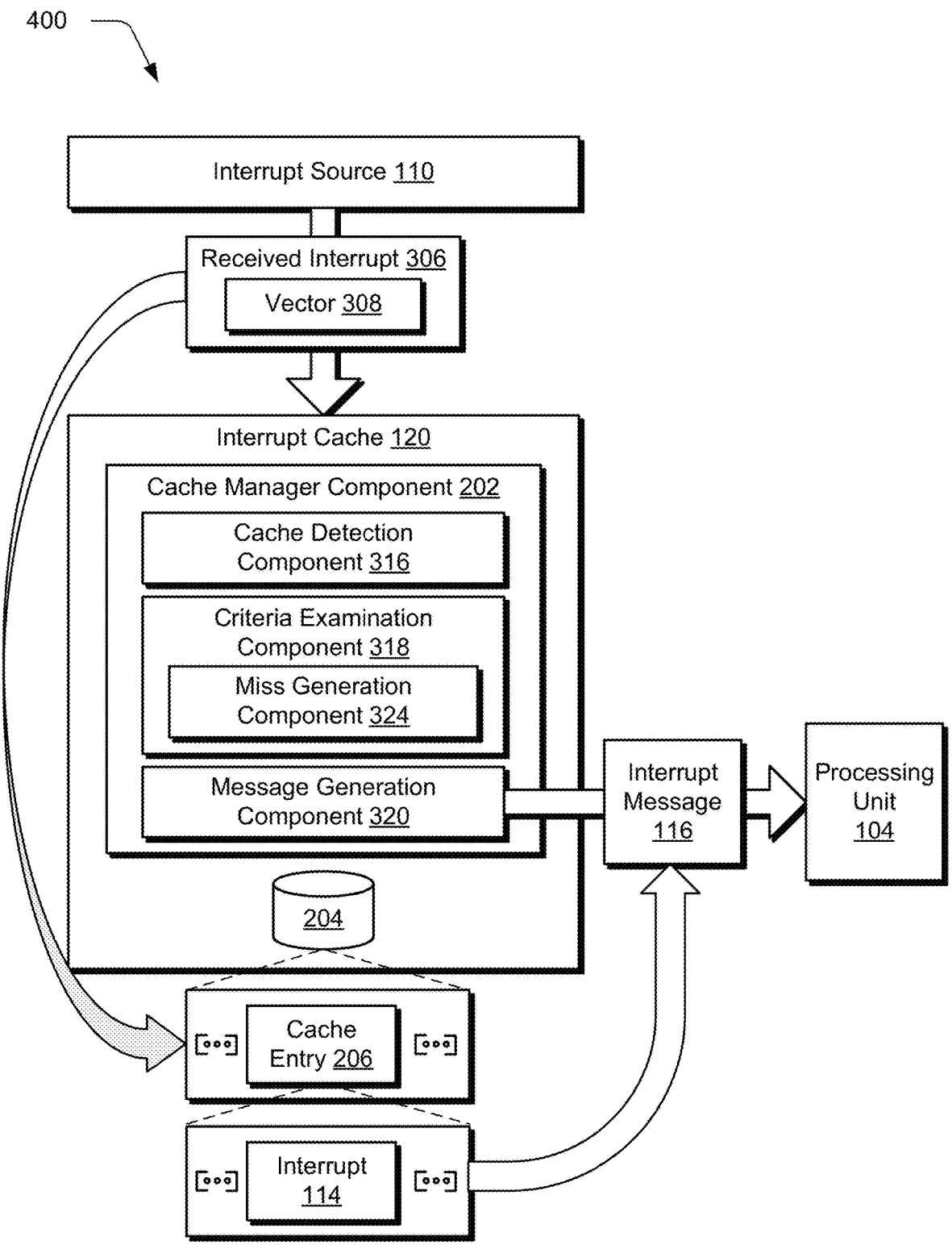
FIG. 4 is a block diagram of a non-limiting example system showing operation of the interrupt cache of FIG. 3 in greater detail as showing interrupt replacement.

FIG. 4 is a block diagram of a non-limiting example system 400 showing operation of the interrupt cache 120 of FIG. 2 in greater detail as showing interrupt replacement. The miss generation component 324 in this example is employed to include the received interrupt 306 within the cache storage 204. However, because the cache storage 204 is "full" in this example, meaning each of the cache entries 206 are occupied, an interrupt 114 is selected for replacement in the cache storage 204. This causes the replaced interrupt 114 from the cache storage 204 to be included in an interrupt message 116 sent to the processing unit 104. This differs from conventional cache techniques in which the entry is simply removed, but rather is still further processed using the techniques described herein.

A variety of criteria are usable by the miss generation component 324 to identify which interrupt 114 in the cache storage 204 is to be removed. In a first example, a "least-recently-used" interrupt 114 is replaced. In a second example, the interrupt 114 that has a delay time 314 having a least amount of time remaining is replaced. A variety of other examples are also contemplated, e.g., based on a number of coalesced instances of the same vector 312 to replace an instance that has a highest number of instances, lowest number of instances, and so forth.

In an implementation, a number of cache entries 206 in the cache storage 204 is based on a maximum number of interrupt events that are generated with a maximum delay time (e.g., delay time 314) for a respective interrupt source 110. This is usable to set the number of cache entries 206 smaller than the expected maximum number of interrupt events to support a compact implementation. In another example, the number of entries is set as approximating the number and the delay time 314 is also set based on these observations.

Further, heuristics are employable as part of the interrupt cache 120 to guide which interrupts are maintained in the cache storage 204. For example, a "hint" is includable by the interrupt source 110 as part of the received interrupt 306 to indicate a likelihood that multiple instances of the received interrupt 306 are received for correlation with the delay time 314. The cache manager component 202 then processes the received interrupt 306 based on this hint, e.g., to provide directly to the processing unit 104 without inclusion in the cache storage 204, include in the cache storage 204, and so forth. A variety of other examples are also contemplated.

FIG. 5 depicts a procedure 500 in an example implementation of interrupt cache configuration and usage.

An interrupt is received by an interrupt cache from an interrupt source, the interrupt corresponding to an interrupt event configured for execution by an interrupt service routine executed by a processing unit (block 502). By way of example, an interrupt source 110 generates an interrupt which forms the received interrupt 306 received by the interrupt cache 120. The received interrupt 306 includes a vector 308 that is usable to identify a corresponding interrupt service routine 118 of a processing unit 104 that is to process the interrupt event.

An interrupt message is generated by the interrupt cache for transmission to the processing unit. The interrupt message includes at least one interrupt from the interrupt cache that is to be replaced in the interrupt cache by the received interrupt (block 504). By way of example, the received interrupt 306 is a "miss" to the cache storage 204. Therefore, the received interrupt 306 is to be included in the cache storage 204. In an instance in which the cache entries 206 are full and therefore not available, the received interrupt 306 is to replace an interrupt 114 in the cache storage 204. To do so, an interrupt message 116 is generated to include the interrupt 114 to be replaced.

The received interrupt is stored in the interrupt cache (block 506). By way of example, the received interrupt 306 is stored in the cache storage 204, along with cache data 310 indicating a number of coalesced instances of the same vector 312 and a delay time 314. It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the apparatus 102, the processing unit 104, and the device 106) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. An apparatus comprising:
    a processing unit configured to execute a plurality of interrupt service routines; and
    an interrupt cache including:
        cache storage configured to store a plurality of interrupts received from an interrupt source, the plurality of interrupts corresponding to a plurality of interrupt events configured for execution by the plurality of interrupt service routines; and
        a cache manager component configured to generate an interrupt message for transmission to the processing unit based on detecting whether an interrupt received from the interrupt source is a hit or a miss to the plurality of interrupts stored in the cache storage, the interrupt message generated to include at least one interrupt of the plurality of interrupts from the cache storage.

2. The apparatus of claim 1, wherein the cache manager component is configured to maintain data including a number of instances of respective interrupts of the plurality of interrupts stored in the cache storage and the interrupt message is generated based on the data.

3. The apparatus of claim 1, wherein the cache manager component is configured to maintain data indicating an amount of time to delay transmission of respective interrupts of the plurality of interrupts stored in the cache storage and the interrupt message is generated based on the data.

4. The apparatus of claim 1, wherein the cache manager component is configured to generate the interrupt message based on detecting an amount of time associated with the at least one interrupt has been exceeded.

5. The apparatus of claim 4, wherein the cache manager component is configured to perform the detecting at respective time intervals.

6. The apparatus of claim 1, wherein the plurality of interrupts is associated with a plurality of amounts of time and the interrupt message is generated for the at least one interrupt based on detecting the at least one interrupt has a least amount of time remaining of the plurality of amounts of time.

7. The apparatus of claim 1, wherein the cache manager component is configured to adjust a counter based on detecting the interrupt received from the interrupt source is a hit, the counter indicating a number of instances of the received interrupt that are included in the cache storage.

8. The apparatus of claim 1, wherein the cache manager component is configured to generate the interrupt message including the at least one interrupt from the interrupt cache based on detecting the interrupt received from the interrupt source is a miss and the cache storage is full.

9. The apparatus of claim 8, wherein the interrupt received from the interrupt source replaces the at least one interrupt in the cache storage.

10. The apparatus of claim 1, wherein the at least one interrupt is included in the interrupt message for transmission to a respective interrupt service routine of the plurality of interrupt service routines, the respective interrupt service routine identified based on a vector included as part of the at least one interrupt.

11. The apparatus of claim 1, wherein the cache manager component is configured to bypass the cache storage based on one or more heuristics.

12. The apparatus of claim 1, wherein the interrupt source and the interrupt cache are included as part of the processing unit.

13. An interrupt cache comprising:
    cache storage configured to store a plurality of cache entries for a plurality of interrupts, the plurality of interrupts identifying a plurality of interrupt events configured for execution, respectively, by a plurality of interrupt service routines by a processing unit; and
    a cache manager component configured to generate an interrupt message including at least one interrupt event of the plurality of interrupt events from the cache storage for transmission to the processing unit based on detecting whether a received interrupt event is a hit or a miss to the plurality of interrupt events.

14. The interrupt cache of claim 13, wherein the cache manager component is configured to maintain data including a number of instances of respective interrupts of the plurality of interrupts stored in the cache storage and generate the interrupt message generated based on the data.

15. The interrupt cache of claim 13, wherein the cache manager component is configured to maintain data indicating an amount of time to delay transmission of respective interrupts of the plurality of interrupts stored in the cache storage and generate the interrupt message based on the data.

16. The interrupt cache of claim 13, wherein the cache manager component is configured to adjust a counter indicating a number of instances of a received interrupt that are included in the cache storage based on detecting the received interrupt is a hit to the cache storage.

17. The interrupt cache of claim 13, wherein the cache manager component is configured to generate the interrupt message including the at least one interrupt from the interrupt cache based on detecting a received interrupt is a miss to the cache storage and the cache storage is full.

18. A method comprising:
    receiving an interrupt by an interrupt cache from an interrupt source, the interrupt corresponding to an interrupt event configured for execution by an interrupt service routine executed by a processing unit;

generating an interrupt message by the interrupt cache for transmission to the processing unit, the interrupt message including at least one interrupt from the interrupt cache that is to be replaced in the interrupt cache by the received interrupt, the at least one interrupt selected based on whether the received interrupt is a hit or a miss to at least one of a plurality of interrupts stored in the interrupt cache; and storing the received interrupt in the interrupt cache.

19. The method of claim 18, further comprising maintaining data including a number of instances of respective interrupts of a plurality of interrupts stored in cache storage of the interrupt cache and the generating of the interrupt message is based on the data.

20. The method of claim 18, further comprising:

identifying that the received interrupt is a hit to at least one of the plurality of interrupts stored in the interrupt cache in response to a vector for the received interrupt and a vector for the at least one of the plurality of interrupts stored in the interrupt cache identifying a same interrupt service routine; or identifying that the received interrupt is a miss to the plurality of interrupts stored in the interrupt cache in response to the vector for the received interrupt specifying an interrupt service routine that is different than one or more interrupt service routines specified by respective vectors for the at least one of the plurality of interrupts stored in the interrupt cache.

\* \* \* \* \*